United States Patent
Heinloth et al.

(10) Patent No.: US 6,227,772 B1
(45) Date of Patent: May 8, 2001

(54) CUTTING INSERT AND MILLING TOOL

(75) Inventors: Markus Heinloth, Postbauer-Heng; Reinhold Gesell, Weihenzell; Jurgen Bär, Fürth, all of (DE)

(73) Assignee: Widia GmbH, Essen (DE)

( * ) Notice: Subject to any disclaimer, the term of this patent is extended or adjusted under 35 U.S.C. 154(b) by 0 days.

(21) Appl. No.: 09/355,294

(22) PCT Filed: Feb. 3, 1998

(86) PCT No.: PCT/DE98/00310

§ 371 Date: Jul. 26, 1999

§ 102(e) Date: Jul. 26, 1999

(87) PCT Pub. No.: WO98/34747

PCT Pub. Date: Aug. 13, 1998

(30) Foreign Application Priority Data

Feb. 10, 1997 (DE) ................................................ 197 04 931
Aug. 21, 1997 (DE) ................................................ 197 36 379

(51) Int. Cl.⁷ ............................................ B23B 27/16
(52) U.S. Cl. .............................. 407/113; 407/114; 407/115
(58) Field of Search ............................ 407/113, 114, 407/115, 116, 117

(56) References Cited

U.S. PATENT DOCUMENTS

| | | |
|---|---|---|
| 3,188,717 * | 6/1965 | Heinlein ............................ 407/114 X |
| 3,762,005 | 10/1973 | Erkfritz . |
| 4,124,326 * | 11/1978 | Cost ...................................... 407/114 |
| 4,789,273 | 12/1988 | Wiacek et al. . |
| 5,639,189 * | 6/1997 | Hoefler .............................. 407/116 X |
| 5,727,910 * | 3/1998 | Leeb ................................. 407/114 X |

FOREIGN PATENT DOCUMENTS

| | | |
|---|---|---|
| 83 17 114 U | 10/1983 | (DE) . |
| 9308150 | 10/1993 | (DE) . |
| 295 16 668 U1 | 2/1996 | (DE) . |
| 195 16 946 A1 | 11/1996 | (DE) . |
| 197 04 931 C1 | 3/1998 | (DE) . |
| 0 207 914 B1 | 1/1987 | (EP) . |
| 605 668 B1 | 9/1988 | (EP) . |
| 0 372 717 B1 | 1/1994 | (EP) . |
| 2 105 966 | 4/1972 | (FR) . |

* cited by examiner

*Primary Examiner*—Henry Tsai
(74) *Attorney, Agent, or Firm*—Herbert Dubno

(57) ABSTRACT

The invention relates to a cutting insert (10) with 8 usable cutting edges and with large longitudinal surfaces, each comprising a protruding rib (20) in the center along their longitudinal axes. The cutting edges (13) defining said longitudinal surfaces form an angle of $70°<(90°-\beta)<90°$ with their respective ends and the short rounded edges (14) of the upper and lower surfaces (11, 12). According to the invention, milling tools are fitted with a plurality of such cutting inserts.

16 Claims, 6 Drawing Sheets

CUTTING INSERT AND MILLING TOOL

CROSS REFERENCE TO RELATED APPLICATIONS

This application is a national stage of PCT/DE98/00310 filed Feb. 3, 1998 and based upon German national applications 197 04 931.1 of Feb. 10, 1997 and 197 36 379.2 of Aug. 21, 1997 under the International Convention.

FIELD OF THE INVENTION

The invention relates to a cutting insert with a substantially cubical base body which is formed as a turning plate with eight usable cutting edges including two mutually parallel planar and large faces traversed by a fastening hole and four lateral faces bounding each of the larger faces, namely, two mutually parallel smaller end faces and two mutually parallel larger longitudinal faces which, centrally along their longitudinal axis, have a projecting rib serving as an abutment surface upon clamping of the cutting insert in a tool carrier, whereby the larger faces have a rounded edge transition into the smaller end faces so that at the longitudinal sides, approximately one-quarter-circular cutting edges are formed as boundary lines to the end faces in the corner regions, whereby the longitudinal cutting edges are formed as boundary lines between the larger faces and the respective longitudinal face bounding same and are curved arc-like so that a mirror-symmetrical body with respect to the longitudinal median plane and to the transverse median plane results.

BACKGROUND OF THE INVENTION

Such a cutting insert is known for example from DE 295 16 668 U1. This cutting insert has four long cutting edges which have convex ground arc contours. The longitudinal faces are bounded by short rectilinear cutting edges with the respective end faces at the short end sides and which via respective one-quarter-circular cutting edge corners, transition into the longer cutting edges. Thus all of the aforementioned cutting edges have positive leading edge angles which are formed on the longitudinal sides at the longer cutting edges with chip-forming troughs and similar troughs are arranged also in the regions of the one-quarter circular cutting edge corners.

A multiplicity of such cutting inserts can be uniformly distributed on a milling cutter head along the periphery. The cutting inserts on the peripheral surface and those on the end face of the tool carrier are so mounted that all of the cutting inserts in their effective positions have cutting edges which can remove chips in the radial or axial direction. Those cutting edges which in their effective positions are active in the radial direction project slightly beyond the cutting edges inserted into the end face of the tool carrier while the cutting edges effective at the end face of the tool carrier are so inserted that in the axial direction the cutting edges each project beyond the cutting edges of the cutting plates inserted into the periphery of the tool carrier.

In order to enable the function described in the aforementioned reference to be achieved, the insertion positions must be radial and axial so that the eight cutters are usable. It is here a disadvantage that the first plate must be offset from the next by a certain amount so that there will be no damage to the milled contour by projecting plates where there is an adjustable free angle. For the milling of crankshafts, the aforedescribed turning plates are not suitable in any case. The same applies also for the substantially identically shaped cutting plates of U.S. Pat. No. 3,762,005.

OBJECT OF THE INVENTION

It is the object of the present invention to provide a cutting insert for tangential incorporation in a milling tool whereby the milling cut depth can be increased and simultaneously a sufficient chip discharge away from the machined workpiece can be ensured.

SUMMARY OF THE INVENTION

These objects are attained with the cutting insert of claim 1.

According to the invention, the longer cutting edges here form with their respective ends and the rounded edges between the smaller end faces and the larger faces an angle <90°. Stated otherwise, the longer cutting edges have a concave configuration or, in the middle region of the cutting edge a constriction.

A cutting insert is indeed known from DE 83 17 114.2 U1 which, in a plan view, has a substantially rectangular configuration and whose longer sides of the cutting faces are provided at their centers with a substantial constriction but wherein the associated lateral edges are not configured for chip removal or are not cutting edges.

With the configuration according to the invention, the intermediate part which is set back relative to the cutting edge ends on either side thereof is used in the cutting by one or the other cutting edge and thus is "twice" used. In milling, the main wear which arises is in the regions of the cutting corners. The cutting insert according to the invention, which is fastened on a mill tangentially, enables in crankshaft machining greater over-measure of the flanks arising in the crank region to be so overlapped that a cutting depth greater than (0.5×cutting plate length) is possible since, as has already been noted, both the left and the right cutting edge halves of the cutter can be utilized and the middle region of both left and right cutters, can be used.

For forming the arc-shaped curvature, there are two variants which can be selected: in one, the longer cutting edges are at least partly configured as concave or can be formed with an angle >180° between the adjoining linear portions. It is important that the basically concave configuration imparted to the longer cutting edges retain a constriction, i.e. a set back middle region.

According to a further feature of the invention, the intermediate region of the longer cutting edge is linearly shaped, preferably with a length up to one-half the total length of the cutting edge. According to a further feature of the invention, the lateral chip angle between the longitudinal cutting edge and the rounded edge is between 0° and 20°; the cutting angle between the greater surface and the longitudinal side is positive and preferably lies between 0° and 20°.

The concave configuration of the longer cutting edges enables, in combination with the intermediate rib, the formation of specially configured chip chambers. The rib width should not exceed 1.5 mm which ensures a spacial separation of the cutting edges lying respectively on both sides of the rib from one another, whereby the intermediate rib can protect the cutting edge which is not engaged in the machining operation from the chip which is cut away and can serve as an abutment surface for the plate seat. The projecting of the rib in the intermediate region can be positive or negative relative to the bounding surface region, especially when the cutting insert seat is configured as convex. The length/width ratio of the larger face and thus the respective longer cutting edge to the (shorter) rounded edges is preferably between 1.2 and 2. The shortest spacing of the fastening hole edge from the longer cutting edges lies below 2 mm.

To stabilize the region of the cutting edges in the corner regions as a preventative to cutting edge breakage, the cutting insert alternative of claim 9 is proposed.

This cutting insert has longer cutting edges with respective ends forming with the round edges between the smaller end faces and the larger face, an angle between more than 70° and less than 90°. Additionally at least one of the cutting surfaces between the larger face and smaller end faces is a plane which is oriented at an angle between 90° and 180° to the smaller end face and on the longitudinal side forms an auxiliary cutting edge which is disposed at an angle of attack κ between 0°<κ<90°, preferably κ=20°+10°. By the flattening in the corner region with formation of an auxiliary cutting edge, the maximum chip thickness can be reduced correspondingly to the sine of the angle κ which stabilizes the cutting corner.

A further advantage of this cutting insert is given, for example, in the crank bearing machining of crankshaft since the described cutting insert can be used for roughing machining with the concavely formed long cutting edge and the described auxiliary cutting edge, to roughing being followed by (fine) finish machining.

Further features of the invention are described thus according to a first embodiment, the longer cutting edges are composed of portions bounding each other at an angle in excess of 180° whereby the lengths of the aforedescribed auxiliary cutting edges is at a maximum as large as the lengths of each of the outer portions.

Preferably the planes and boundary faces adjoin one another by rounded edges, preferably at an angle of less than 90°. The respective edge radius between the plane and the larger face in a further embodiment of the invention is a maximum of 3 mm. The radius between the plane and the smaller end face should preferably be between 1 mm to 4 mm.

The subject of the invention is, in addition, a milling tool, especially a disk mill with a multiplicity of clamped cutting units as is known, for example, from DE 205 16 668 U1. This milling cutting head or the cutting plates mounted thereon will differ in the case of fine cutting plates and coarse cutting plates.

To obtain a milling tool with radial machining feed, as is required especially for crankshaft machining, at least a part of the tangential clamped cutting inserts are selected to correspond to the aforedescribed shape. In a corresponding way, the radially clamped cutting inserts can also impart shapes corresponding to the mounting of the aforedescribed cutting inserts. However, preferably such cutting inserts are selected which have a shape which corresponds to a cut along the longitudinal median plane of the cutting insert and with a half as given in one of claims 1 to 8. This should be understood in connection with the fact that with a radial clamping only a "short" cutting edge can be cut with the cutting corner. The four cut versions obtained in this manner can have the same chip angle and lateral cutting angle as the aforedescribed cutting plate with eight cutters.

According to a further configuration of the milling tool and to achieve the object of the invention, smaller bearing widths can be machined, which extend over less than twice the cutting insert length but is selected to be above 1.5 times the plate width in which the tool holder is configured as a disk and alternately has radially and tangentially clamped cutting inserts. In the axial as well as in the radial direction of the disk, tangentially and radially clamped cutting inserts thus alternate with one another whereby the longitudinal axial height of the wheel lies by a certain amount below twice the length of a cutting insert.

According to a further configuration of the invention, respective end side chamfers bound one another whereby the plates (the cutting inserts) are made so free that they do not intersect the rib 20 in extension of the auxiliary cutting edge.

Furthermore, to increase the stability at all cutting edges, a chamfer of a width up to 0.2 mm and at a chamfer angle up to 20° is provided.

BRIEF DESCRIPTION OF THE DRAWING

The above and other subjects, features, and advantages will become more readily apparent from the following description, reference being made to the accompanying drawing in which.

SPECIFIC DESCRIPTION

Figure 1:
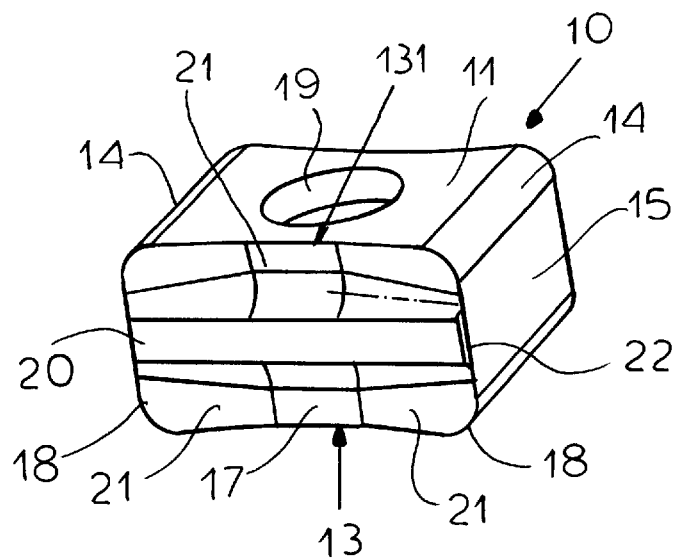
FIG. 1 is a perspective view of a cutting insert according to the invention.
Figure 2:
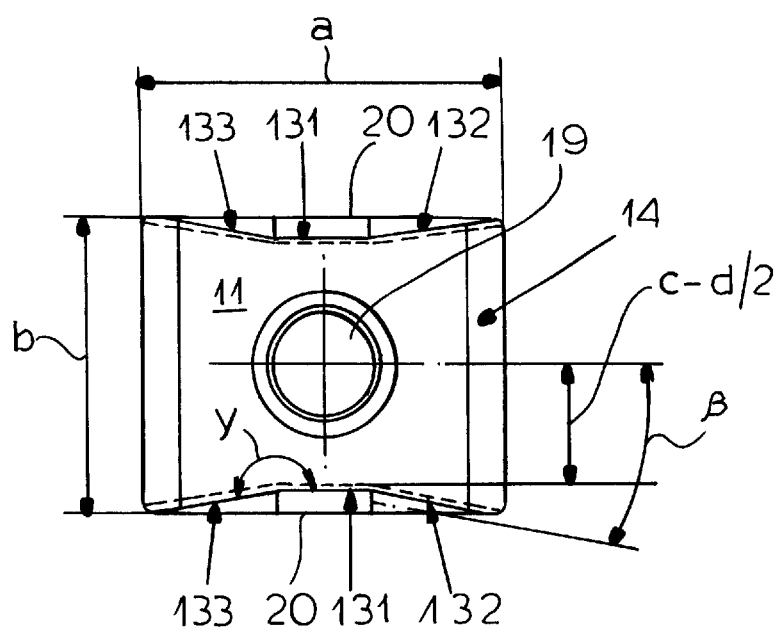
FIG. 2 is a plan view of this cutting insert.
Figure 3:
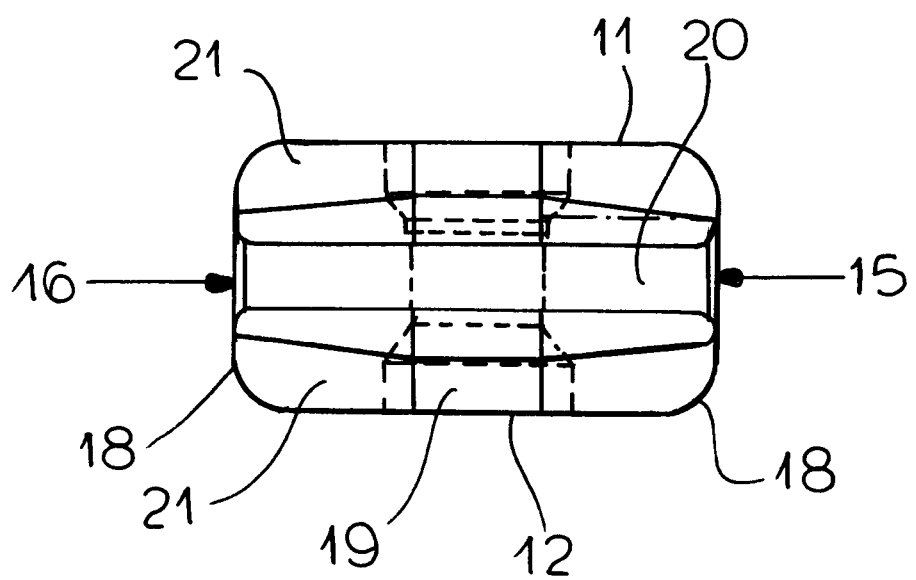
FIGS. 3, 4 are respective side views of this cutting insert.

The cutting insert 10 shown in FIGS. 1 to 4 and configured as a turning or cutting plate is comprised of a substantially retangular parallelopipedal base body having two mutually parallel large faces 11 and 12 which are bounded on the longitudinal sides by long cutting edges 13. Each of the long cutting edges has an intermediate constriction or indentation 131 which is located between two respective cutting edge ends 132 and 133. The portions 131 to 133 which collectively form the long cutting edges 113 are each rectilinear. The cutting edge ends 132 and 133 form, with the rounded edges 14, which bound the large faces on the sides, an angle 90°–β where 0°<β<20°. In the illustrated case the angle 90°–β=80°. The cutting edge ends 132 and 133 are of equal length with their absolute values being dependent upon the machining conditions. The intermediate region 131 of the cutting edge is also used upon cutting operation of a respective cutting end 132 or 133 as is made possible because the wear upon working with the cutting edge ends is at least twice as high as in the cutting edge middle. The ratio of the cutting edge ends 132 or 133 to the intermediate region 131 is in the present case about 1:1.4, although it can basically lie between 1:2 and no intermediate region. The ratio of the length to the width a/b according to the invention lies between 1.2 and 2.

The end side small end faces 15 and 16 transition via respective rounded edges 14 into the larger faces 11, 12 via respective approximately one-quarter circular cutting edges 18 formed at the respective longitudinal faces 17, giving namely four such cutting edges 18 at the respective corners of the longitudinal face. The cutting insert 10 has a central fastening hole for a clamping screw or a head for a toggle lever for an eccentric clamp.

At the centers of the longitudinal faces 17, namely, along the longitudinal axes, respective ribs 20 extend over their entire lengths and project outwardly beyond the regions of the face bordering them, i.e. the chip-shaping troughs 21, by about 2 mm.

Figure 4:
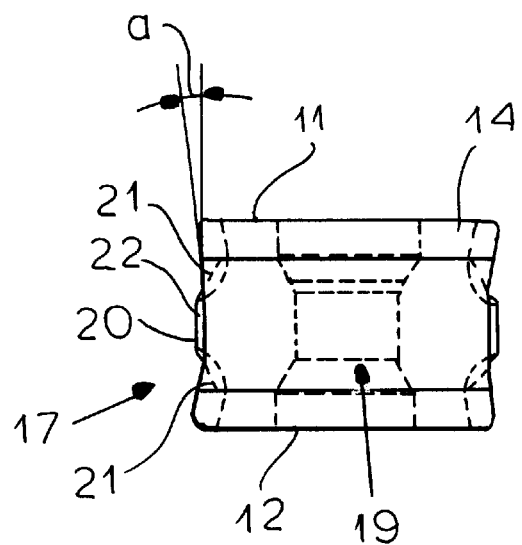

The rib 20 has a width of at least 1.5 mm to ensure the stability of the plate. As the side view according to FIG. 4 shows, the cutting angle α is positive and in the present case is about 10°. The troughs 21 have at their junctions with the long cutting edges 13, a substantially planar flank before they transition via radiuses of a frustocone as the connection piece to the respective rib 20.

The overall configuration of the cutting insert is mirror symmetrical and, indeed, is mirror symmetrical in each axial direction with respect to a respective central section plane. If the cutting insert according to FIGS. 1–4 is tangentially attached for crankshaft machining primarily in the region of the connecting rod bearing, the greater overdimensioning of the flanks is so overlapped that a cutting depth is possible which is greater than 0.5×a. As has already been indicated in this case, the intermediate region 131 of the longer cutting edge 13 is utilized in the cutting operation together with the cutter 132 or 133.

The protected, specially formed chip chamber (trough 21) is configured especially for installation of the cutting insert in the tangential position. The rib 20 between the longer cutting edges serving as the main cutters separates the long cutting edges 123 from one another and serves especially as a fixing abutment for clamping the insert. The spacing of the wall of the bore 19 from the cutting edges 13 is at the smallest location at least 2 mm.

Alternatively and for use on the insert in a milling tool in a radial mounting, by contrast to the turning cutting plate shown in FIGS. 1 to 4 which has eight useful cutting edges, a modified version with only four cutting edges may be employed. The construction of the cutting insert 100 corresponds in detail to that of the cutting insert 10 except that approximately along the longitudinal median plane, i.e. at the level of the rib 20, a cut is formed (it being self-understood that the edges 101 and 102 will be rounded off). As in the case of the eight cutter inserts according to FIGS. 1 to 4, the intermediate region 103 FIG. 5) of the chip-forming trough is configured as a rib which has a projecting shape by contrast with the chip-forming troughs 104 along the edges, this rib being substantially greater than 1.5 mm because of the space available.

The cutting insert 10 which is configured as a turning cutting plate, according to FIGS. 6 to 9, is comprised of a substantially cubical base body having two mutually parallel large faces 11 and 12 which are bounded at their longitudinal sides by longer cutting edges. Each of the longer cutting edges has a central constriction 131 which is located between two respective cutting edge ends 132 and 133. The portions 131 to 133, collectively forming the long cutting edge 13, are each rectilinear, whereby the cutting edge ends 132 and 133 adjoin the rounded edges 14 or the planar surfaces 180 which themselves bound the large face on opposite sides, at an angle of 90°−β where 0°<β<20°. In the illustrated case, the angle 90°−β=80°. The cutting edge ends 132 and 133 are of equal length and their absolute dimensions are determined by the machining conditions. The intermediate region 131 of the cutting edge is used together with the cutting edge end 132 or 133 when the latter is in machining position as is made possible because the wear on machining with the cutting edge ends as at least twice as high as in the cutting edge middle. The ratio of the cutting edge ends 132 or 133 to the intermediate portion 131 in the present case is about 1:1.4. It can however be basically between 1:2 and no intermediate region.

The ratio of the length to the width a/b according to the invention is between 1.2 and 2.

The smaller end faces 15, 16 at the end of the body transition on one side to a rounded edge 14 to the larger face 11, 12, whereby at the longer faces respective quarter circular cutting edges 18 are formed, namely two at each corner of the longitudinal face. At the opposite side, i.e. the remaining sides, the cutting insert has beveled surfaces 180 which are planar and are oriented at obtuse angles to smaller end faces. These surfaces 180 transition by rounded edges into the neighboring surfaces 15 or 16 and 11 or 12. The radius $R_2$ visible in FIG. 8 which also corresponds to the radius R for the rounded edge 18, is 1.6 mm while the radius $R_1$ is selected at 1.6 mm.

Figure 6:
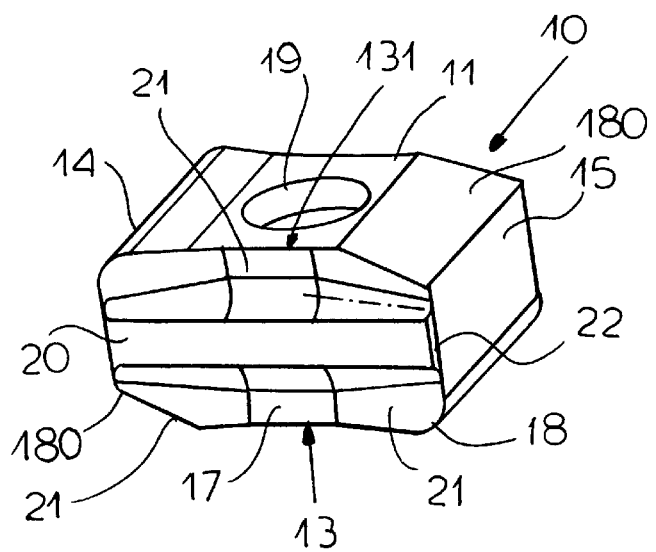
Figure 7:
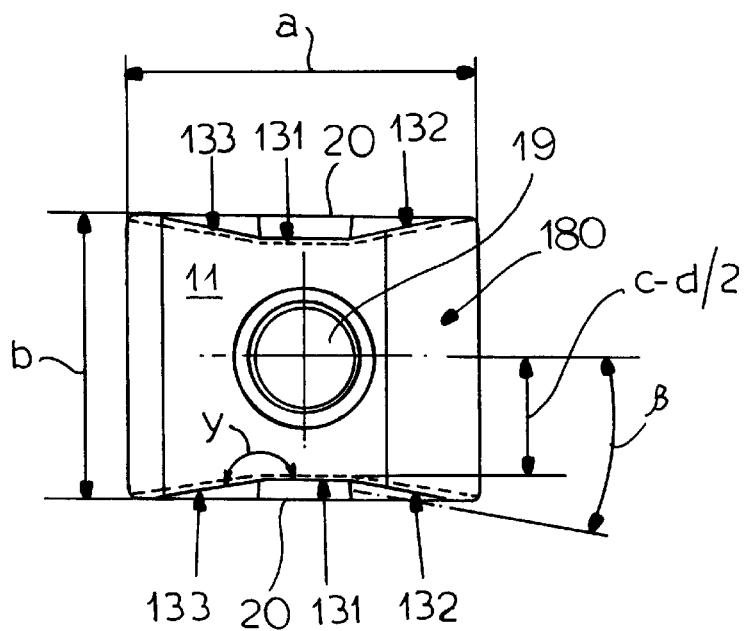
Figure 8:
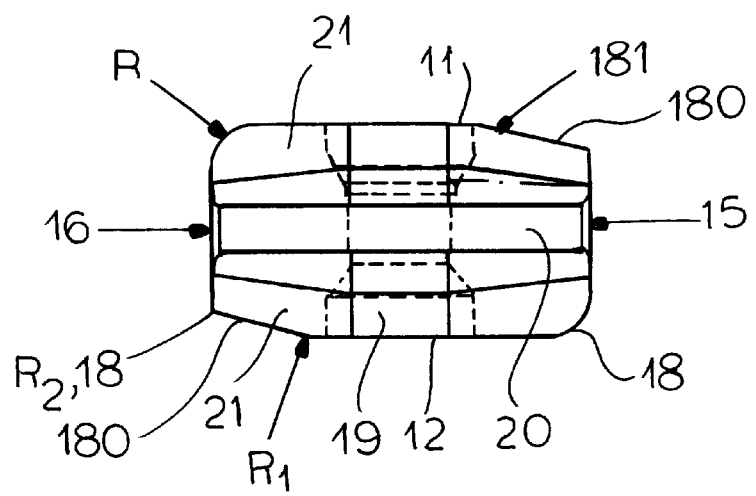
Figure 9:
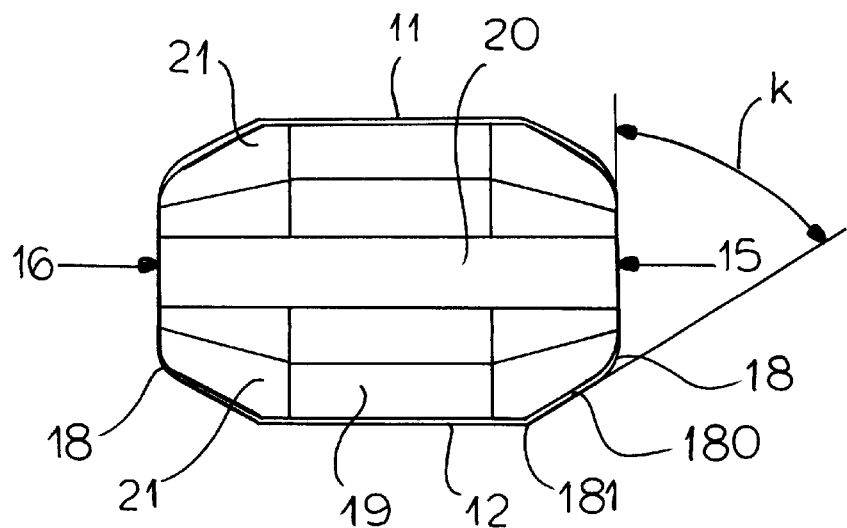
FIG. 9 is an elevational view of a further alternative embodiment of the cutting insert according to the invention and FIG. 10 are schematic illustrations of the mounting of to 13 cutting inserts according to FIGS. 1 to 9 in a milling tool for crankshaft machining.

The cutting insert of FIG. 9 differs from the cutting insert of FIGS. 6 to 8 in that at each of the corner regions there are respective inclined connecting surfaces 180 whose extensions form an angle κ of more than 0° and less than 90° with the respective end faces 15 or 16. The dimensions of the radii are $R_1$ and $R_2$ correspond to those described in FIG. 8. The cutting insert 10 has a central fastening hole for a clamping screw or a head for a toggle lever or eccentric clamp.

At the center of the longitudinal face 17, namely, along the longitudinal axis, a rib 20 extends over the full length and projects beyond the bounding surface regions, i.e. the chip-forming trough 21, by at least 2 mm. The rib 20 has a width of at least 1.5 mm to stabilize the plate. The chip angle formed by the trough 21 is positive and in the present case is about 10°. The trough 21 has a substantially planar flank where it adjoins the longer cutting edge 13 and before it transitions via a radius of a frustocone as the connecting piece to the rib 20.

The overall configuration of the cutting insert of FIG. 9 is mirror symmetrical in both axial directions of a central cutting plane. If the cutting insert according to FIGS. 6 to 9 is screwed on tangentially, the greater overdimension of the cheeks arising in connecting rod-bearing regions in crankshaft machining is so overlapped that a connecting depth is possible which is greater than 0.5×a. As has already been indicated, the intermediate region 131 of the long cutting edge 13 is used together with the cutter 132 or the cutter 133.

The protected specially shaped chip chamber (trough 21) is specially configured for the incorporation of the cutting insert in a tangential position. The rib 20, between the long cutting edges serving as the main cutters, separates the long cutting edges 13 from one another and serves especially as a fixing mount upon clamping. The spacing of the wall of the hole 19 from the cutting edges 13 is at least 2 mm at the smallest point. In contrast to the quarter round corners 18, the edges 180 reduce the maximum chip thickness $h=f_c \sin κ$ and thus reduce the danger of breakage of these cutting edges. The plates according to FIG. 9 can carry out rough machining in the regions 132, 131, 133 and 180.

Figure 5:
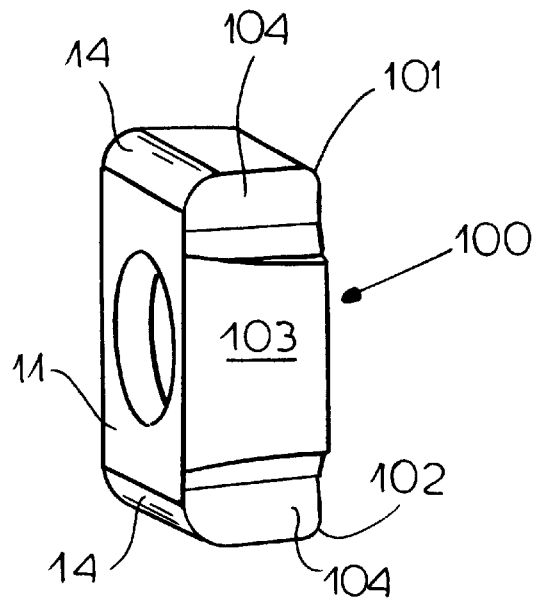
FIG. 5 is a perspective view of a cutting insert version with four useful cutting edges, FIG. 6 a perspective view of a further cutting insert according to the invention, FIG. 7 a plan view of the cutting insert of FIG. 6, FIG. 8 are respective side views of the cutting inserts of FIGS. 6 and 7.
Figure 10:
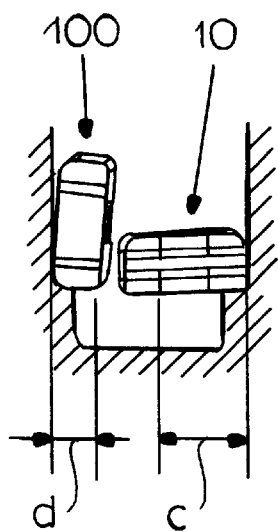

The cutting insert according to FIG. 5 is provided for clamping in a radial mounting, especially in a milling tool where the cutting inserts alternate one behind the other and one next to the other in tangential and radial mountings. This will be apparent especially from FIG. 10 which shows the two cutting inserts 10 and 100 in tangential and radial mounts for a radial cutting feed. The cutting insert 100 has a greatest possible cutting depth d which is determined substantially by the dimension of the shorter edge. The alternating mounting of the four and eight cutting plates of FIGS. 10 and 11 can achieve a cutting width "c" (FIG. 10). The maximal cutting depth of the cutting insert in the tangential direction (dimension c) corresponds approximately to the sum of the lengths of the cutting edge sections 132 or 133 and 131.

Figure 11:
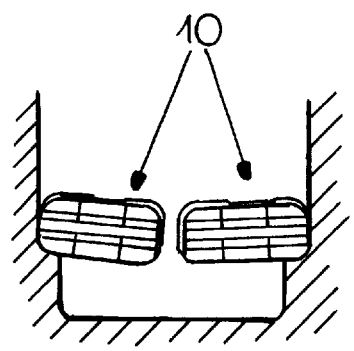

FIG. 11 shows the cutting plate arrangement of FIG. 10 rotated through 90° with the cutting inserts 10 and 100 alternating around the periphery and next to one another.

Figure 12:
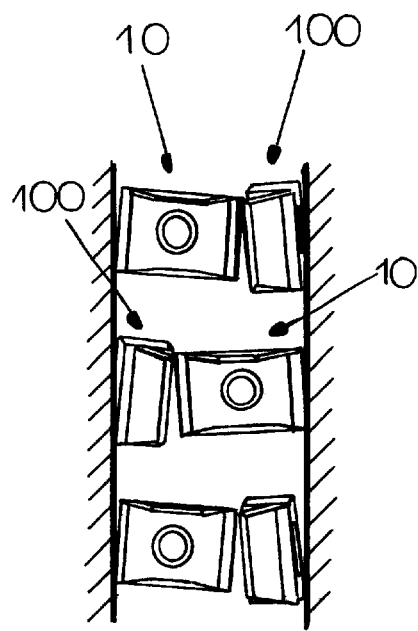
Figure 13:
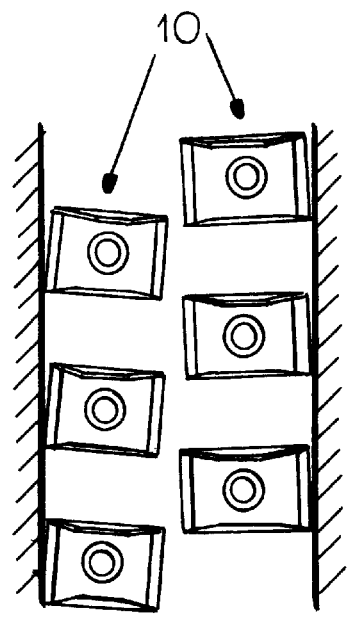

With larger cutting widths (less than 2a) a milling tool with an arrangement of cutting inserts 10 is selected as can be deduced from FIGS. 12 and 13. The cutting inserts 10 in this case are behind one another or adjacent one another along the periphery of a disk-shaped cutting tool which preferably is so shaped that the cutting inserts arranged one behind the other in a row are offset from the cutting inserts of the parallel row by the gaps between them. As is also apparent from FIG. 10 (dimension c) in the tangential mounting, by the configuration of the longitudinal cutting edge and the selected positive cutting geometry, a greater cutting depth can be realized than is obtained in DE 295 16 668 U1 or U.S. Pat. No. 3,762,005. There is a strict distinction between finish plates and roughing plates in a milling cutter as is the case with the configuration of DE 295 16 668 U1 in that it is not required to mount the cutting inserts 10 unitarily in tangential orientations. The embodiment of FIGS. 10 and 11 is only an apparent exception. The cutting inserts 10 mounted in tangential orientations are only complete because of place availability by comparison with the radially mounted cutting inserts 100 which correspond to the "half" cutting inserts 10. In any case it is not required to space a first plate from the next by a certain amount of offset.

What is claimed is:

1. A cutting insert comprising a substantially rectangular parallelopipedal base body formed with two mutually parallel planar large faces pierced by a fastening hole and four side faces respectively bounding same, said side faces including two mutually parallel small end faces and two large longitudinal faces, said longitudinal faces having along respective longitudinal axes, respective projecting ribs serving as a mounting surface upon clamping of the cutting insert in a tool carrier, the large faces transitioning over respective rounded edges into the small end faces so that the longitudinal faces approximately one-quarter-circular cutting edges are formed as boundary lines to the end faces in corner regions of the body, the body having long cutting edges formed as boundary lines between the respective large faces and the respective longitudinal faces bounding the large faces, said body being mirror symmetrical to a longitudinal median plane and to a transverse median plane, respective ends of the long cutting edges and the respective rounded edges between the small end faces and the large faces, form an angle 70°<(90°−β)<90°, where β is a lateral chip angle between a respective end of one of the long cutting edges and said longitudinal median plane.

2. The cutting insert according to claim 1, wherein the long cutting edges are formed as concave or are assembled from linear segments adjoining one another at an angle γ>180°.

3. The cutting insert according to claim 1, wherein the segments are rounded or an intermediate region of one of the long cutting edges is rectilinear with a length up to one-half the total length of said cutting edge.

4. The cutting insert according to claim 1 wherein a chip angle α between a perpendicular to one of the large faces and an adjoining longitudinal face is between 0°<α<20°.

5. The cutting insert according to claim 1 wherein the lateral chip angle β is between 0° and 20°.

6. The cutting insert according to claim 1 wherein the width of the rib at an intermediate region thereof is at least 1.5 mm.

7. The cutting insert according to claim 1 wherein the length/width ratio (a/b) of the large faces at the respective long cutting edges to the short rounded edges lies between 1.2 and 2.

8. The cutting insert according to claim 1 wherein a shortest distance of a fastening hole edge from the longer cutting edges lies below 2 mm.

9. A cutting insert comprising a substantially rectangular parallelopipedal base body formed with two mutually parallel planar large faces pierced by a fastening hole and four side faces respectively bounding same and including two mutually parallel small end faces, and two said longitudinal faces having along respective longitudinal axes respective projecting ribs, the large faces transitioning into the small end faces so that at the longitudinal faces correspondingly shaped cutting edges are provided as boundary lines for the end faces in corner regions, long cutting edges being formed are arcuately curved as boundary lines between the large faces and the longitudinal faces bounding same, said body being mirror symmetrical to a longitudinal median plane and to a transverse median, the long cutting edges forming an angle of 70°<(90°−β)<90° with their respective ends and the rounded edges between the small end faces and the large faces, at least one connecting surface between the large faces and the smaller end faces being formed as a plane which including an obtuse angle <180° with the small end face and which forms on a longitudinal side, an auxiliary cutting edge, where β is a lateral chip angle between a respective end of one of the long cutting edges and said longitudinal median plane.

10. The cutting insert according to claim 9 wherein the long cutting edges are assembled respectively from segments angularly adjoining one another at angles γ>180° and the length of the auxiliary cutting edges is at a maximum as large as the length of each of the segments.

11. The cutting insert according to claim 9 wherein the plane is oriented at an angle κ to a respective small end face and the small end face and the face bounded thereby transition with one another via rounded edges, a radius $R_1$ between the plane and the larger face being $0<R_1\leq 3$ mm and a radius $R_2$ between the plane and the smaller end face being $1\text{ mm}<R_2\leq 4$ mm.

12. A milling tool having a multiplicity of clamped cutting inserts as defined in claim 9 clamped tangentially on a tool holder.

13. The milling tool as defined in claim 12 wherein additional cutting inserts are radially clamped.

14. The milling tool as defined in claim 12 wherein the tool holder is configured as a disk and has alternating radial and tangential clamped cutting inserts, the disk width being smaller than twice the length of the cutting insert.

15. The milling tool according to claim 12 wherein a surface bounding the rib is configured as a bevel.

16. The milling tool according to claim 15 wherein the bevel bounding the cutting edge has a width up to 0.2 mm and a bevel angle between 0° and 20°.

* * * * *